(12) United States Patent
Tak-Wei Hon et al.

(10) Patent No.: US 7,591,473 B2
(45) Date of Patent: Sep. 22, 2009

(54) FOLDING BICYCLE

(75) Inventors: David Tak-Wei Hon, Bldg. DA HON, Furong Industrial Zone, Furong 6$^{th}$ Road, Shajing Town, Bao An, Shenzhen 518125 (CN); Kai Liu, Shenzhen (CN); Jin Feng Li, Shenzhen (CN)

(73) Assignee: David Tak-Wei Hon, Bao An, Shenzhen (CN)

( * ) Notice: Subject to any disclaimer, the term of this patent is extended or adjusted under 35 U.S.C. 154(b) by 300 days.

(21) Appl. No.: 11/714,875

(22) Filed: Mar. 6, 2007

(65) Prior Publication Data

US 2007/0210556 A1 Sep. 13, 2007

(30) Foreign Application Priority Data

Mar. 8, 2006 (CN) .................... 2006 1 0034125

(51) Int. Cl.
*B62K 15/00* (2006.01)
(52) U.S. Cl. .................................. 280/278
(58) Field of Classification Search ............ 280/278, 280/287
See application file for complete search history.

(56) References Cited

U.S. PATENT DOCUMENTS

| 6,364,335 B1* | 4/2002 | Mombelli | 280/287 |
| 2006/0170186 A1* | 8/2006 | Wu | 280/278 |
| 2007/0018422 A1* | 1/2007 | Pan | 280/287 |

FOREIGN PATENT DOCUMENTS

GB 2309015 A * 7/1997

* cited by examiner

*Primary Examiner*—Kevin Hurley
(74) *Attorney, Agent, or Firm*—Morris Manning Martin LLP; Tim Tingkang Xia, Esq.

(57) ABSTRACT

The present invention discloses a folding bicycle, wherein a folding joint is installed on the beam, and the rear fork is hinged with the frame via a hinge axle, on the rear fork is installed a support bar which rests against the frame; and wherein the beam is S-shaped, and the hinge axle is tilted by an acute angle with respect to the central axle of the frame. When the bicycle is folded, the front and rear wheels are located separately, each at one side of the beam and within the concave section of the S-shaped beam, so that the bicycle is more compact and has a less width after being folded.

4 Claims, 5 Drawing Sheets

FOLDING BICYCLE

CROSS-REFERENCE TO RELATED APPLICATION

The present invention claims priority of CN Patent Application No. 200610034125.1 filed on Mar. 8, 2006, the contents of which are incorporated herein by reference for all purposes.

TECHNICAL FIELD

The present invention relates to a folding bicycle, particularly to a folding bicycle with multiple folding points.

BACKGROUND OF THE INVENTION

A common folding bicycle has only one folding joint on its beam, by which the bike frame can be folded laterally so that the front and rear wheels can be put together. As shown in FIG. 1, after the bicycle is folded, the frame sticks out and the bicycle is still too bulky for packing and carrying. As shown in FIG. 2, in a folding bicycle disclosed by a UK patent, a folding joint is installed on its beam and the rear fork is hinged with the frame, so that the front part of the bicycle can be folded laterally via the folding joint and the rear fork can be folded forward around the hinge axle 6a. As shown in FIG. 3, since this bicycle can be folded at two points, after the bicycle is folded, the frame is positioned between two wheels instead of sticking out, and the folded bicycle is smaller in volume. However, since the hinge axle 6a is parallel to the central axle 7a, after the bicycle is folded, the rear wheel 8a is positioned below the beam 3a. As a result, the beam is slightly higher than the wheel. Meanwhile, the beam must be humped up in order to have the rear wheel placed under it, which looks not natural and orderly, and which affects the strength and rigidity of the folded bicycle. Furthermore, since the hinge axle is parallel to the central axle, the rear part of the bicycle can not be folded sufficiently close to the beam and the bicycle still has a large width after being folded.

SUMMARY OF THE INVENTION

The object of the present invention is to provide a folding bicycle which has a smaller volume after being folded.

The folding bicycle according to the present invention comprises a frame, a front wheel, a rear wheel and a rear fork; wherein the frame includes a beam and a central axle; and wherein a folding joint is installed on the beam, and the rear fork is hinged with the frame via a hinge axle, on the rear fork is installed a support bar which rests against the frame; and wherein the beam is S-shaped, and the hinge axle is tilted by an acute angle with respect to the central axle of the frame.

According to the present invention, since there is an angle between the hinge axle and the central axle, when the rear fork is folded forward, the rear wheel moves to one side of the beam instead of being located below the beam, and the height of the folded bicycle can be reduced to be the same as that of its wheels. At the same time, since the beam is S-shaped, when the bicycle is folded, the front and rear wheels are located separately, each at one side of the beam and within the concave section of the S-shaped beam, so that the bicycle is more compact and has a less width after being folded. In conclusion, the folding bicycle of the present invention has a less height and less width and therefore occupies a smaller volume after being folded.

DETAILED DESCRIPTION OF THE PREFERRED EMBODIMENT

Figure 1:
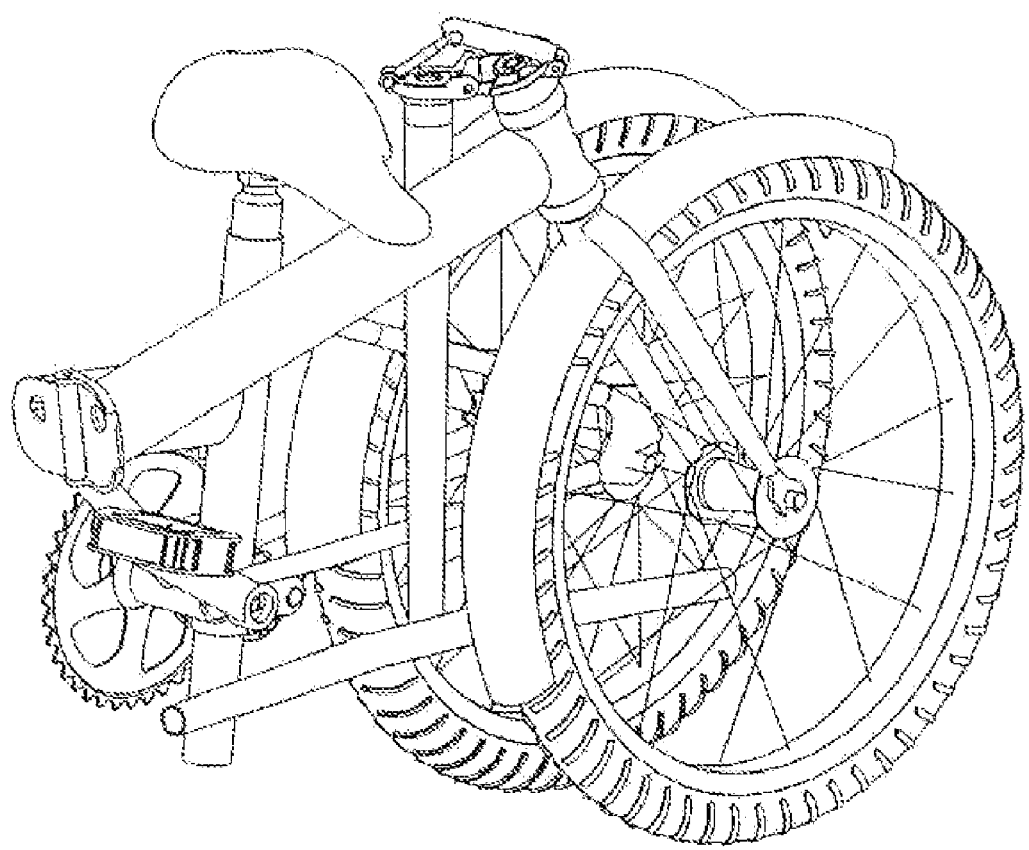
FIG. 1 is a three dimensional view of a common folding bicycle after being folded.
Figure 2:
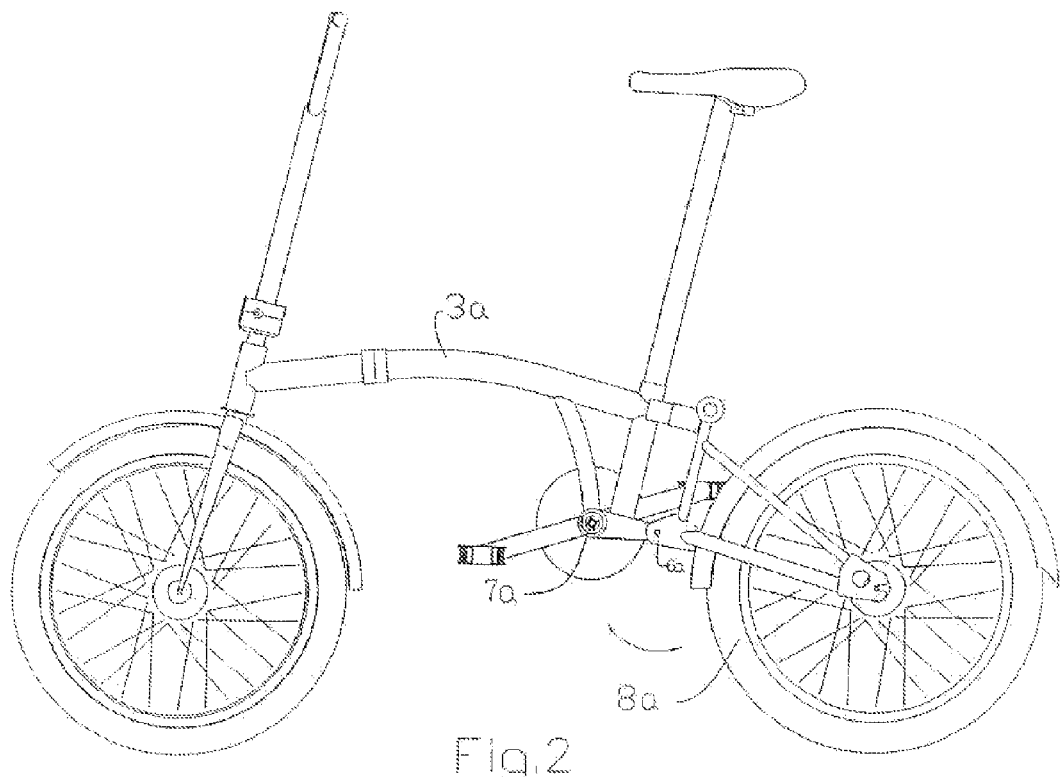
FIG. 2 is a schematic view of another prior art folding bicycle.
Figure 3:
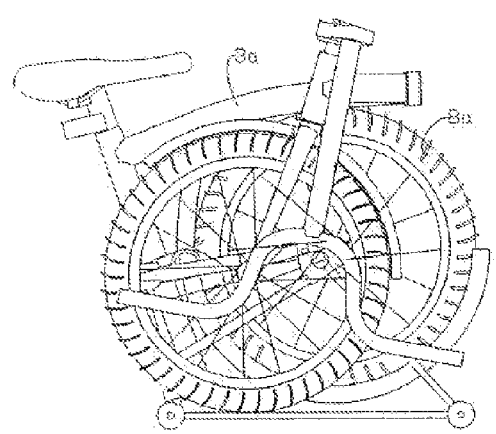
FIG. 3 is a schematic view of the folding bicycle as shown in FIG. 2 when it is folded.
Figure 4:
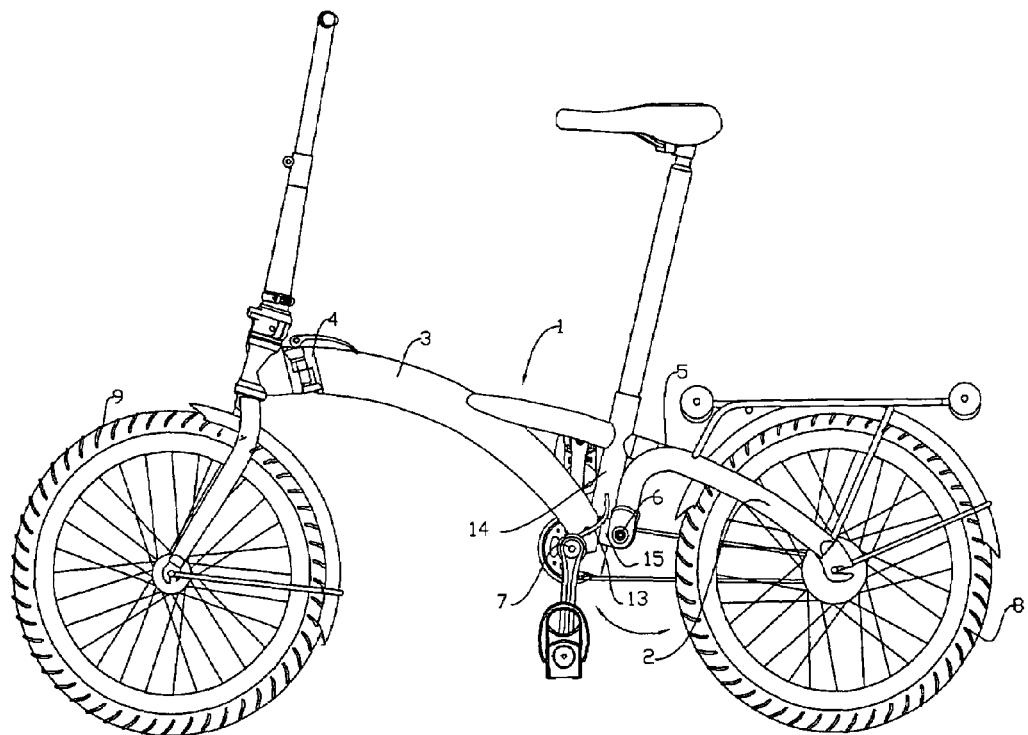
FIG. 4 is a schematic view of the folding bicycle according to the present invention.
Figure 5:
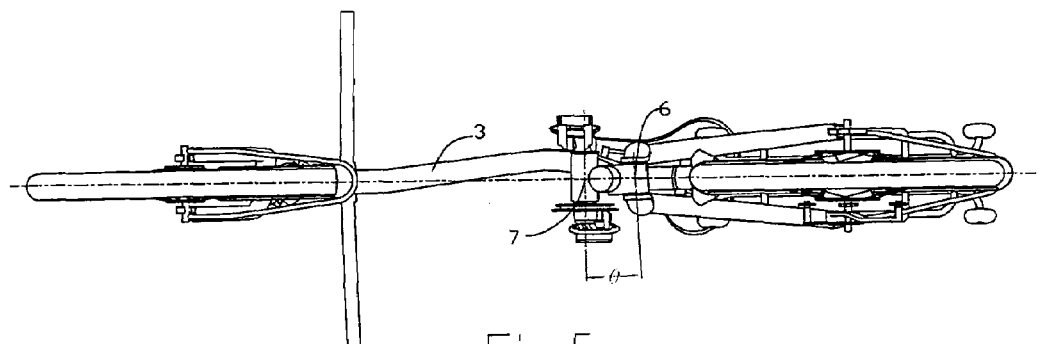
FIG. 5 is a top view of FIG. 4.
Figure 6:
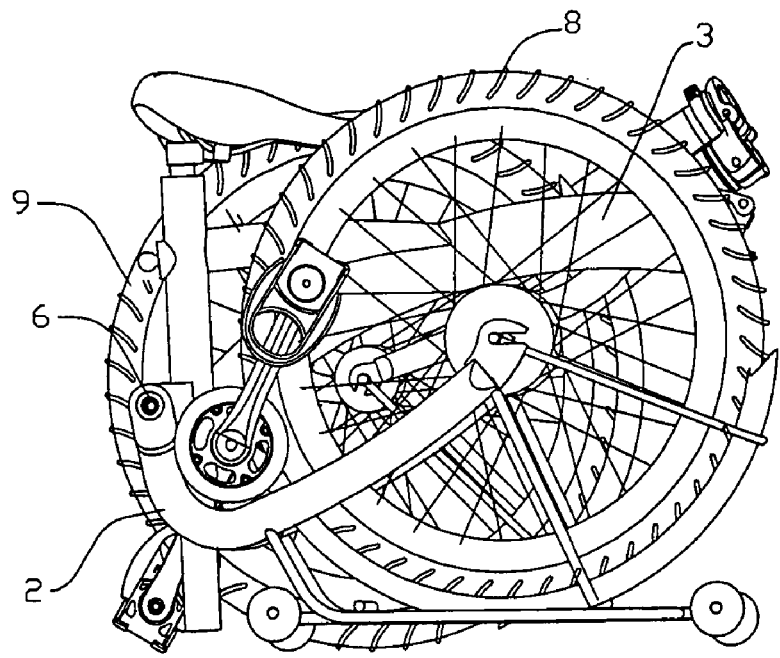
FIG. 6 is a schematic view of the folding bicycle as shown in FIG. 5 when it is folded.
Figure 7:
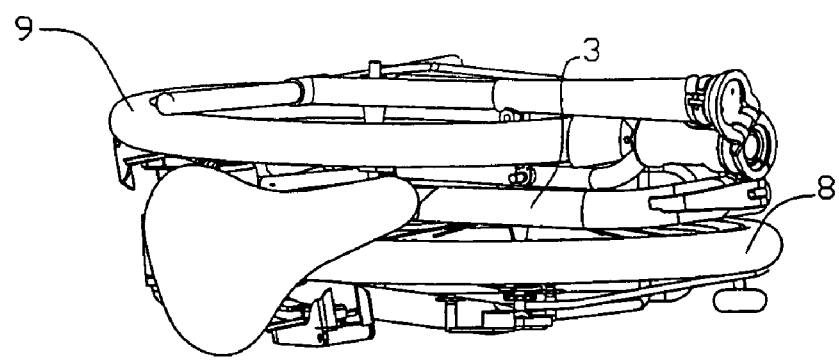
FIG. 7 is a top view of FIG. 6.

A folding bicycle of the present invention is shown in FIGS. 4 and 5. Wherein the rear fork 2 is hinged with the frame 1 via a hinge axle 6, a folding joint 4 is installed on the beam 3, and on the rear fork 2 is installed a support bar 5 which rests against the frame 1. Viewing from the top, the beam 3 is slightly S-shaped, and the hinge axle 6 is tilted by an acute angle θ with respect to the frame central axle 7. As shown in FIG. 6, when the rear fork 2 is folded forward, the rear wheel 8 moves to one side of the beam 3 instead of being located below the beam 3, and the height of the folded bicycle can be reduced to be the same as that of its wheels. As shown in FIG. 7, since the beam 3 is slightly S-shaped, when the bicycle is folded, the front wheel 8 and the rear wheel 9 are located separately, each at one side of the beam 3 and within the concave section of the S-shaped beam 3, so that the bicycle is more compact and has a less width after being folded.

To ensure that the rear wheel 8 closely clings to one side of the beam 3 without large deviation, the angle between the hinge axle 6 and the central axle 7 should be controlled between 1° to 5°.

Figure 8:
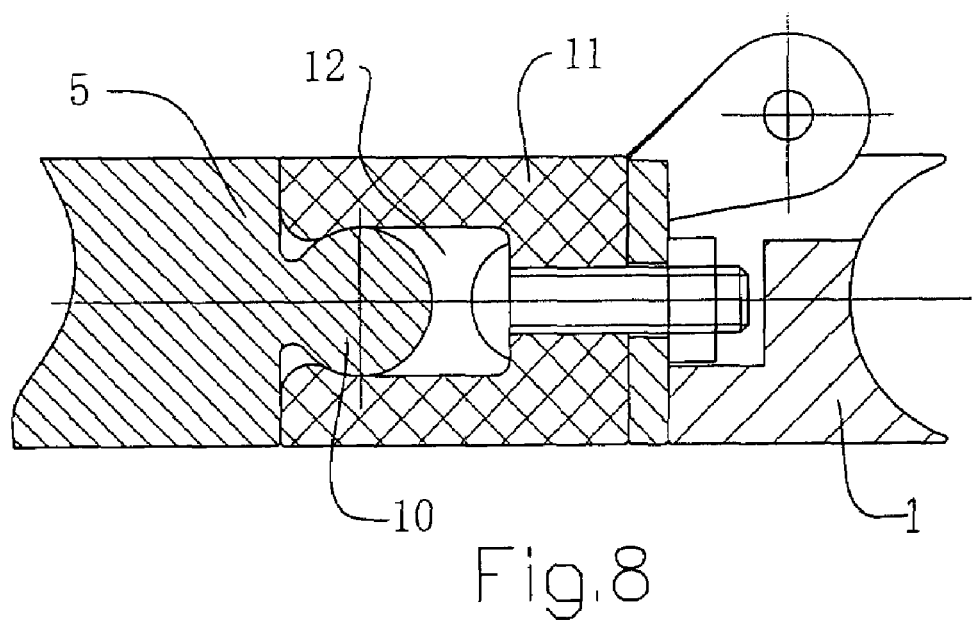
FIG. 8 is a cutaway view of the joint between the support bar and the frame of the folding bicycle of the present invention.

When the folding bicycle is riding on a rugged road, the support bar 5 and frame 1 are easy to disengage and get collided, which will cause large vibration and noises, and affect the safety and comfort for riding. To avoid the above mentioned situations, as shown in FIG. 8, the top of the support bar 5 can be made into or can be fixed with a ball protrusion 10, correspondingly a sleeve 11 with a hole 12 is provided at the frame 1, so that, when the bicycle is unfolded, the ball protrusion 10 is inserted into the hole 12 of the sleeve 11, by which the support bar 5 gets engaged with the frame 1. The sleeve 11 is made of elastic materials, such as hard rubber. When the bicycle is bumping, the rubber sleeve 11 will be properly deformed so as to conform to the bumping. At the same time, the ball protrusion 10 and the rubber sleeve 11 are not easy to disengage and get collided because of a large friction therebetween. As a result, the vibration and noises are reduced, and the bicycle is more comfortable to ride on.

To further increase the strength of the folding bicycle, a reinforcing rib 13 is provided at the frame 1, which is welded to connect the beam 3, the seat tube 14 and the hinge seat 15 into a whole as shown in FIG. 4, wherein the hinge axle 6 is mounted within the hinge seat 15.

What is claimed is:

1. A folding bicycle comprising:
 a frame (1);
 a front fork;
 a rear fork (2);
 a front wheel (9) connected with the frame (1) via the front fork; and
 a rear wheel (8) connected with the frame (1) via the rear fork (2);
 wherein a support bar (5) is installed on the rear fork (2), the support bar (5) rests against the frame (1);
 wherein the frame (1) includes a beam (3), the beam (3) is S-shaped when viewing from the top; a folding joint (4) is installed on the beam (3); a hinge seat (15) is installed at the rear bottom part of the beam (3), the hinge seat (15) is hinged with the rear fork (2) via a hinge axle (6), the hinge axle (6) is mounted within the hinge seat (15); a central axle (7) is installed at the rear bottom part of the beam (3) and at the front of the hinge seat (15); the hinge axle (6) is tilted by an acute angle with respect to the central axle (7) of the frame (1).

2. The folding bicycle according to claim 1, wherein the angle between the hinge axle (6) and the central axle (7) is between 1° to 5°.

3. The folding bicycle according to claim 1, wherein the top of the support bar (5) has a ball protrusion (10), correspondingly a sleeve (11) with a hole (12) is provided at the frame (1), such that the ball protrusion (10) can be inserted into the hole (12) of the sleeve (11), and wherein the sleeve (11) is made of elastic materials.

4. The folding bicycle according to claim 1, wherein a reinforcing rib (13) is provided at the frame (1), the reinforcing rib (13) is welded to connect the beam (3), a seat tube (14) and a hinge seat (15) into a whole.

* * * * *